(12) United States Patent
El Maghraoui et al.

(10) Patent No.: US 9,244,831 B2
(45) Date of Patent: *Jan. 26, 2016

(54) DYNAMIC TUNING OF INTERNAL PARAMETERS FOR SOLID-STATE DISK BASED ON WORKLOAD ACCESS PATTERNS

(71) Applicant: INTERNATIONAL BUSINESS MACHINES CORPORATION, Armonk, NY (US)

(72) Inventors: Kaoutar El Maghraoui, Yorktown Heights, NY (US); Hubertus Franke, Cortlandt Manor, NY (US); Gokul B. Kandiraju, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/677,928

(22) Filed: Nov. 15, 2012

(65) Prior Publication Data

US 2014/0122776 A1    May 1, 2014

Related U.S. Application Data

(63) Continuation of application No. 13/664,753, filed on Oct. 31, 2012, now Pat. No. 9,098,400.

(51) Int. Cl.
| | | |
|---|---|---|
| G06F 12/16 | (2006.01) | |
| G06F 12/02 | (2006.01) | |
| G06F 3/06 | (2006.01) | |

(52) U.S. Cl.
CPC ............ *G06F 12/0246* (2013.01); *G06F 3/061* (2013.01); *G06F 3/064* (2013.01); *G06F 3/0631* (2013.01); *G06F 3/0679* (2013.01);

(Continued)

(58) Field of Classification Search
CPC . G06F 3/0649; G06F 3/0679; G06F 11/3409; G06F 11/3466; G06F 12/0246; G06F 12/1027; G06F 12/1474
USPC .................................................. 711/103, 154
See application file for complete search history.

(56) References Cited

U.S. PATENT DOCUMENTS

| | | |
|---|---|---|
| 8,201,020 B2 | 6/2012 | Cagno et al. |
| 2007/0283125 A1* | 12/2007 | Manczak et al. .............. 711/207 |
| 2008/0010534 A1 | 1/2008 | Athale et al. |

(Continued)

FOREIGN PATENT DOCUMENTS

| | | |
|---|---|---|
| JP | 2011040041 A | 2/2011 |
| WO | WO2012075200 A2 | 6/2012 |
| WO | WO2012091486 A1 | 7/2012 |

OTHER PUBLICATIONS

International Business Machines. "Optimized Solid State Drive Utilization in a System With Heterogenous Solid State and Mechanical Disks" IP.com Prior Art Database. May 2009. pp. 1-7.

*Primary Examiner* — John Lane
(74) *Attorney, Agent, or Firm* — Tutunjian & Bitetto, P.C.; Preston J. Young, Esq.

(57) ABSTRACT

A system and method for tuning a solid state disk memory includes computing a metric representing a usage trend of a solid state disk memory. Whether one or more parameters need to be adjusted to provide a change in performance is determined. The parameter is adjusted in accordance with the metric to impact the performance of running workloads. These steps are repeated after an elapsed time interval.

24 Claims, 5 Drawing Sheets

(52) U.S. Cl.
CPC . *G06F2212/7205* (2013.01); *G06F 2212/7207* (2013.01); *G06F 2212/7211* (2013.01)

(56) References Cited

U.S. PATENT DOCUMENTS

| | | | |
|---|---|---|---|
| 2010/0082884 A1* | 4/2010 | Chen et al. | 711/103 |
| 2011/0161553 A1* | 6/2011 | Saxena et al. | 711/103 |
| 2011/0320915 A1 | 12/2011 | Khan | |
| 2012/0151286 A1 | 6/2012 | Li et al. | |
| 2012/0239868 A1* | 9/2012 | Ryan et al. | 711/103 |
| 2012/0331229 A1* | 12/2012 | Sabir | 711/118 |
| 2013/0103891 A1* | 4/2013 | Sharon et al. | 711/103 |
| 2013/0246734 A1* | 9/2013 | Schaefer et al. | 711/206 |
| 2013/0275684 A1* | 10/2013 | Tuck et al. | 711/133 |
| 2013/0326169 A1* | 12/2013 | Shaharabany et al. | 711/161 |
| 2014/0082322 A1* | 3/2014 | Loh et al. | 711/202 |
| 2014/0181585 A1* | 6/2014 | Hoang et al. | 714/26 |

\* cited by examiner

DYNAMIC TUNING OF INTERNAL PARAMETERS FOR SOLID-STATE DISK BASED ON WORKLOAD ACCESS PATTERNS

RELATED APPLICATION INFORMATION

This application is a Continuation application of U.S. patent application Ser. No. 13/664,753 filed on Oct. 31, 2012, incorporated herein by reference in its entirety.

BACKGROUND

1. Technical Field

The present invention relates to solid state disks, and more particularly to solid state disk memory management to improve performance and endurance.

2. Description of Related Art

With the evolution of applications that process large amounts of data (e.g., BigData Analytics applications), high-performance and dynamic storage is becoming a necessity. Support for high-performance data analysis is a key ingredient, especially in enterprise systems. To provide fast data access (and thereby quick analysis), many enterprise systems use Solid-State Disks (SSDs).

SSDs are typically made up of flash memory, which has emerged as an important technology for persistent data storage both for personal computers and enterprise systems. An SSD is typically read and written in units of pages. Each page is usually 2 k bytes to 4 k bytes. Several pages (e.g., 64-256 pages) form a block. In addition, Flash memory typically has a constraint that a block may be written only a certain number of times, after which the block becomes invalid. Wear-leveling schemes are provided in SSDs to increase the lifetime of blocks (and hence of the entire SSD).

While SSDs provide efficient read access, writes are more complex because in-place updates are not possible in flash memory. Therefore, SSD vendors normally ship SSDs with a layer called the Flash Translation Layer (FTL) that remaps every write to a different block/page and exposes an SSD as a standard block device (like a hard disk).

SSDs internally maintain translation tables to map received 'logical' addresses into actual 'physical' addresses. As applications run and access SSDs, the access pattern continuously results in changes to these translation tables. These tables can be at a block level, page level or hybrid (mix of block and page). A page-level translation scheme provides maximum lifetime of an SSD (but with increased memory overhead) whereas a block level translation (which occupies much less memory) will provide less lifetime. Hybrid schemes have been proposed as a mix of both these extremes to provide a better lifetime with less memory.

SUMMARY

A system and method for tuning a solid state disk memory includes computing a metric representing a usage trend of a solid state disk memory. Whether one or more parameters need to be adjusted to provide a change in performance is determined. The parameter is adjusted in accordance with the metric to impact the performance of running workloads. These steps are repeated after an elapsed time interval.

Another method for tuning a solid state disk memory includes computing a linearity metric by employing a logical to physical translation table to obtain usage pattern data representing a usage trend of a solid state disk memory over one or more time intervals; determining whether a parameter needs to be adjusted to provide a change in performance by consulting a lookup table or formula; and adjusting the parameter in accordance with the metric to change the performance.

Yet another method for tuning a solid state disk memory includes receiving access request information in a solid state disk controller; storing the access request information in a translation table; computing a linearity metric, using a regression technique, from the access request information in the translation table to obtain usage pattern data representing a usage trend of a solid state disk memory over one or more time intervals; determining whether a parameter needs to be tuned to provide increased memory lifetime by consulting a lookup table or formula; adjusting the parameter in accordance with the metric to increase an overall lifetime of the solid state disk memory; and rechecking whether adjustments are needed after an elapsed time interval.

These methods may be performed on a computer readable storage medium comprising a computer readable program for tuning a solid state disk memory, wherein the computer readable program when executed on a solid state disk controller causes the solid state disk controller to perform the methods steps.

A solid state disk memory system includes a solid state disk controller having a translation layer. The translation layer includes a data structure for storing access data, a linearity computation module configured to compute a metric representing a usage trend of a solid state disk memory using the access data and an adjustment module configured to determine whether a parameter needs to be adjusted and an amount of adjustment in accordance with the metric to change performance of the solid state disk memory.

Another solid state disk memory system includes a solid state disk controller having a translation layer. The translation layer includes a data structure for storing access data, a linearity computation module configured to compute a metric representing a usage trend of a solid state disk memory using the access data and an adjustment module configured to determine whether a parameter needs to be adjusted and an amount of adjustment in accordance with the metric to change performance of the solid state disk memory. One or more solid state disks are includes in the solid state disk memory. The solid state disks are managed by the solid state disk controller to increase lifetime of the disks by distributing usage over the one or more solid state disks.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
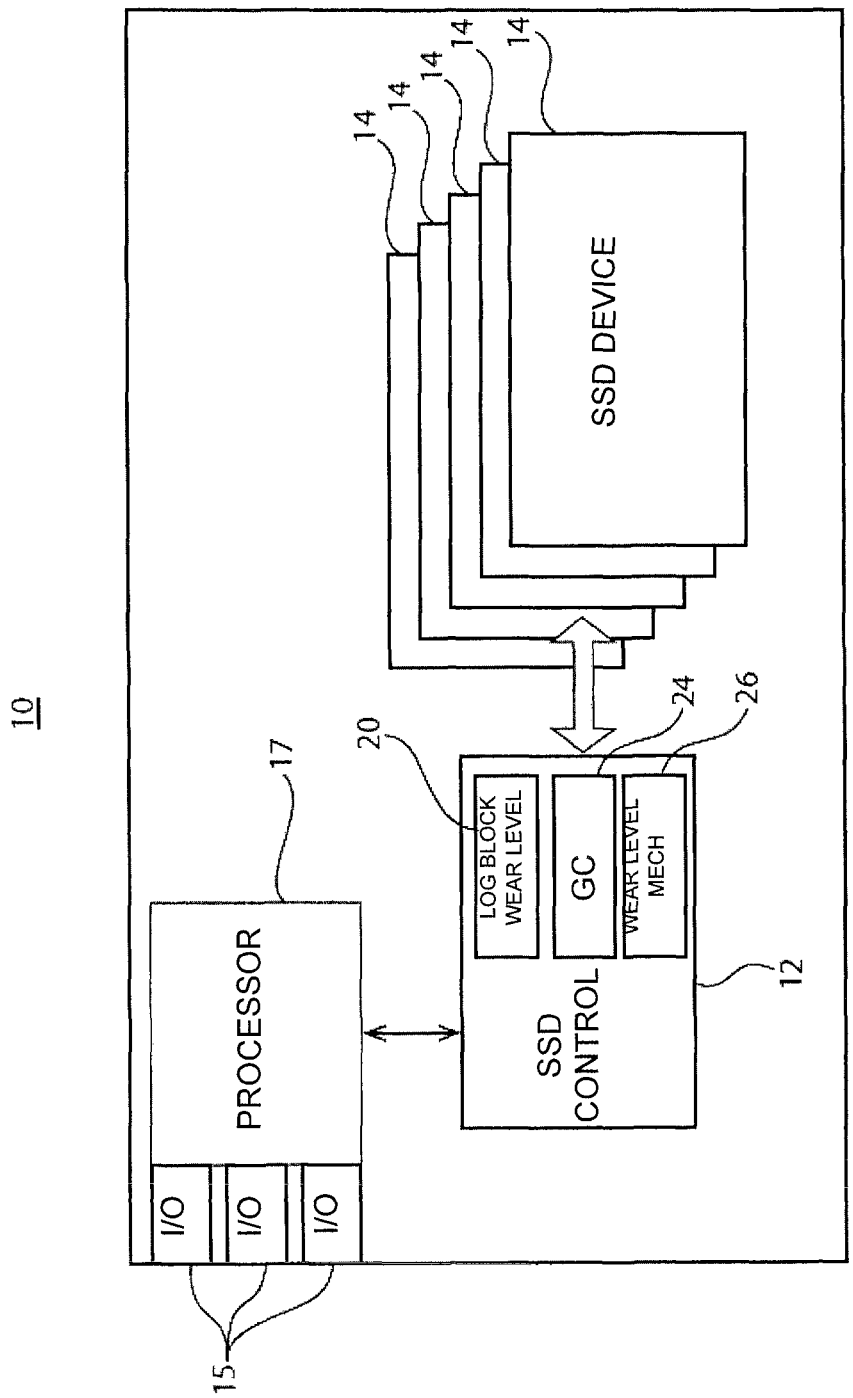
FIG. 1 is a block/flow diagram showing a solid state disk memory system in accordance with one illustrative embodiment.

In accordance with the present principles, systems and methods for dynamically tuning internal parameters for solid state disks (SSD) are provided. The internal parameters may be tuned by analyzing translation mapping tables and computing metrics using, e.g., linear-regression models (such as, e.g., ANOVA, etc.). Adjustments and tuning are implemented to improve performance and increase endurance of SSDs.

Diversity in today's applications imposes diverse and continuously changing demands on a computer system. With applications being so diverse, dynamic ways of tuning such parameters by capturing the diversity of running workloads' access patterns is useful. Optimization of an SSD may be provided by setting parameters for individual applications. This may include pre-fetching, caching, internal SSD wear-leveling parameters (e.g., the number of block-mapped pages versus page-mapped pages in hybrid Flash Translation Layer (FTL) schemes), etc.

In one embodiment, access patterns of applications in the SSD Flash controller can be understood without requiring any user or application intervention. This knowledge can be employed to dynamically tune the SSD parameters for higher application performance and/or more SSD endurance. In another embodiment, linearity metrics may be employed. Linearity metrics capture the access patterns of a workload running on SSD. These linearity metrics are simple enough to be computed with reasonable computational overhead. Such computations can also be done in the background so as to not interfere with a critical SSD access path.

In addition to tuning functional parameters, such as garbage collection or wear-leveling parameters, the access pattern knowledge can have multiple uses such as turning on/off various functions, such as, pre-fetching, caching, etc. The present principles also leverage current features of SSDs. For example, translation tables in SSDs are persistent information that the SSD needs to maintain, thus there is negligible additional memory/storage requirement to calculate metrics related to these tables.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, an illustrative solid state disk (SSD) memory system 10 is shown in accordance with one illustrative embodiment. The system 10 includes a SSD controller 12 and one or more flash memory devices 14. The system 10 may include any number of devices or systems that employ SSD memory. Such devices may include, e.g., cameras, video games controllers, video or music players, computers, printers or another device configured to employ SSD memory, e.g., flash memory. The system 10 includes input/output ports 15 which may be employed to interact with the controller 12 and memory device 14.

The system 10 may employ a logical page and physical page memory management system. The SSD controller 12 is selectively coupled to one or more SSD memory devices 14. The controller 12 may include a processor or may work in conjunction with one or more processors 17 of the system 10. The controller 12 may include memory or may employ the memory of the SSD memory devices 14.

The controller 12 may include a plurality of mechanisms that assist in managing memory storage on and in between SSD devices 14. These mechanisms may be implemented at the Flash Translation Layer (FTL) of the controller 12. These mechanisms may be employed to provide a more even distribution of interactions with the SSD devices 14 resulting in more even wear and increased memory lifetimes. The mechanisms described herein may be employed as tunable mechanisms having their use enabled or changed in accordance with the present principles. It should be understood that the tunable parameters used to control these mechanisms are illustrations and should not be considered as limiting. Moreover, other mechanisms in addition to or instead of the illustrated mechanisms are contemplated in accordance with the present principles.

In one embodiment, a log block wear-leveling approach mechanism 20 may be included and controlled by the controller 12. Most of the SSD device is block-mapped. These blocks are referred to as data blocks. A small number of blocks, referred to as log blocks, are page-mapped. The main purpose of log blocks is to deal with overwrites to the data blocks. When the first overwrite happens to a page in a data block, a log block is associated with this data block. The overwritten page in the data block is invalidated and copied to the first available page in the log block. Any subsequent overwrites to the same data block are written to the next available pages in the log block. When all the pages in the log block are used. The data block and its associated log block are merged into a free erased data block. By including the new content (overwrites) to the log block, the data block does not have to be completely discarded. This reduces access cycles and wear and increases lifetime of the device. To access the new content, the page is accessed and directed to the associated log block.

Another mechanism may include a garbage collector (GC) 24, which may be launched periodically to recycle invalidated physical pages, consolidate valid pages into a new erased block, and clean old invalidated blocks. A wear-leveling mechanism 26 may be included to ensure even wear over memory space. Since writes are often concentrated on a subset of data, which may cause some blocks to wear out earlier than the others, the wear-leveling mechanism 26 tracks and shuffles hot and cold data to even out writes in flash memory to colder locations to ensure evenly distributed writing. This results in extended lifetime of the solid state memory device. These mechanisms and other mechanisms may be controlled and adjusted in accordance with workload or access pattern feedback as will be set forth in further detail herein.

Figure 2:
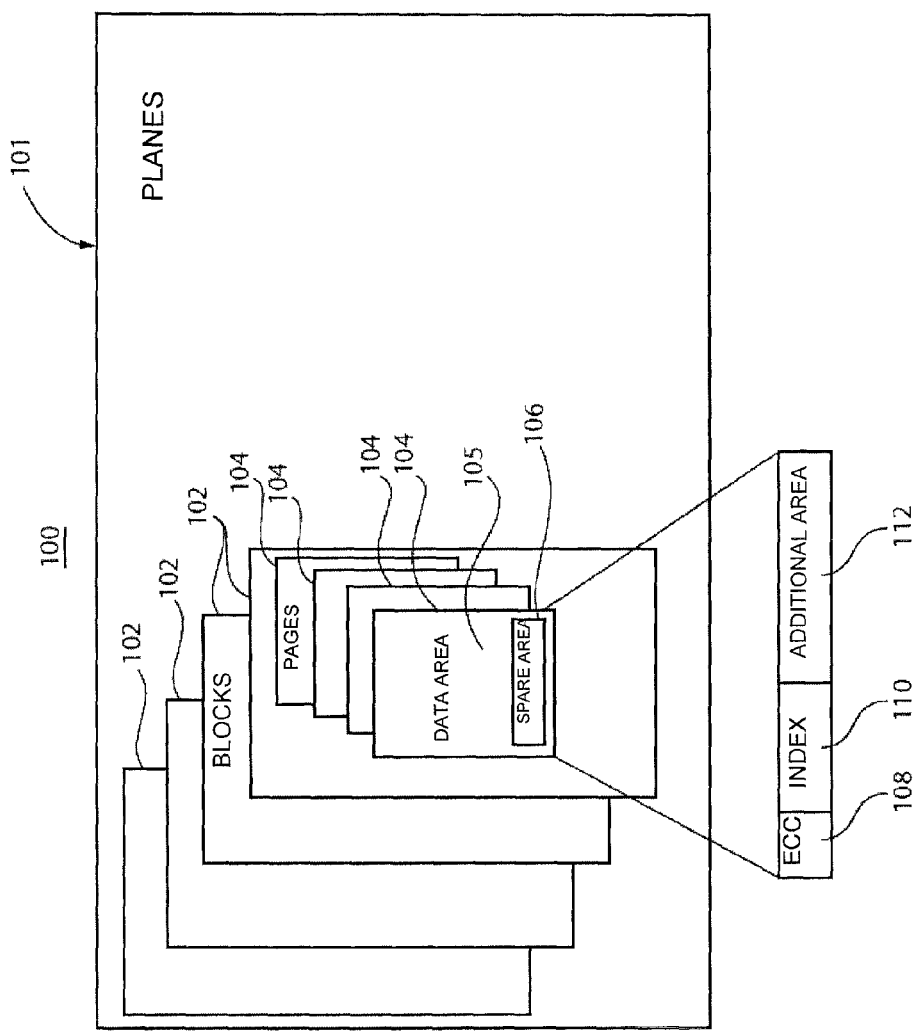
FIG. 2 is a block/flow diagram showing a flash translation layer of a solid state disk controller in accordance with one illustrative embodiment.

Referring to FIG. 2, the SSD devices 14 may include a flash memory device 100, which is a solid state disk (SSD). Flash device 100 is shown in accordance with an illustrative embodiment, and schematically depicts internal organization of the flash device 100. The flash device 100 is internally divided into planes 101. Each plane 101 has a set of blocks 102. Each block 102 has a set of pages 104 (there are, e.g., 64 or 128 pages per block). Each page 104 has a data area 105 and is also associated with a spare area 106. The flash device 100 can be read from and written to in a granularity of pages 104, for example.

As compared to a typical Hard Disk drive, flash memory (and an SSD including flash memory) has some technical constraints. One constraint includes that no in-place overwrite is available. A whole block must be erased before writing (programming) any page in a block. Another constraint includes that no random writes are available. The pages in a block must be written to (programmed) sequentially. There are limited erase or program cycles available. A block can wear out after a certain number of erase or program cycles (this may be, say $10^4$ cycles for an MLC Flash and $10^5$ for SLC Flash).

Note that as described herein "block" refers to the Flash Block which is made up of multiple Flash Pages. Also, "page" refers to a single unit of write (e.g., 2 k/4 k). Each page 104 may include a spare area 106 where additional information may be stored. The spare area 106 may be divided into regions where additional information and indexes may be stored. For example, one region 108 may include error correction codes (ECC) while another region may include logical page number (LPN) or other index 110. Additional area is available in region 112.

Figure 3:
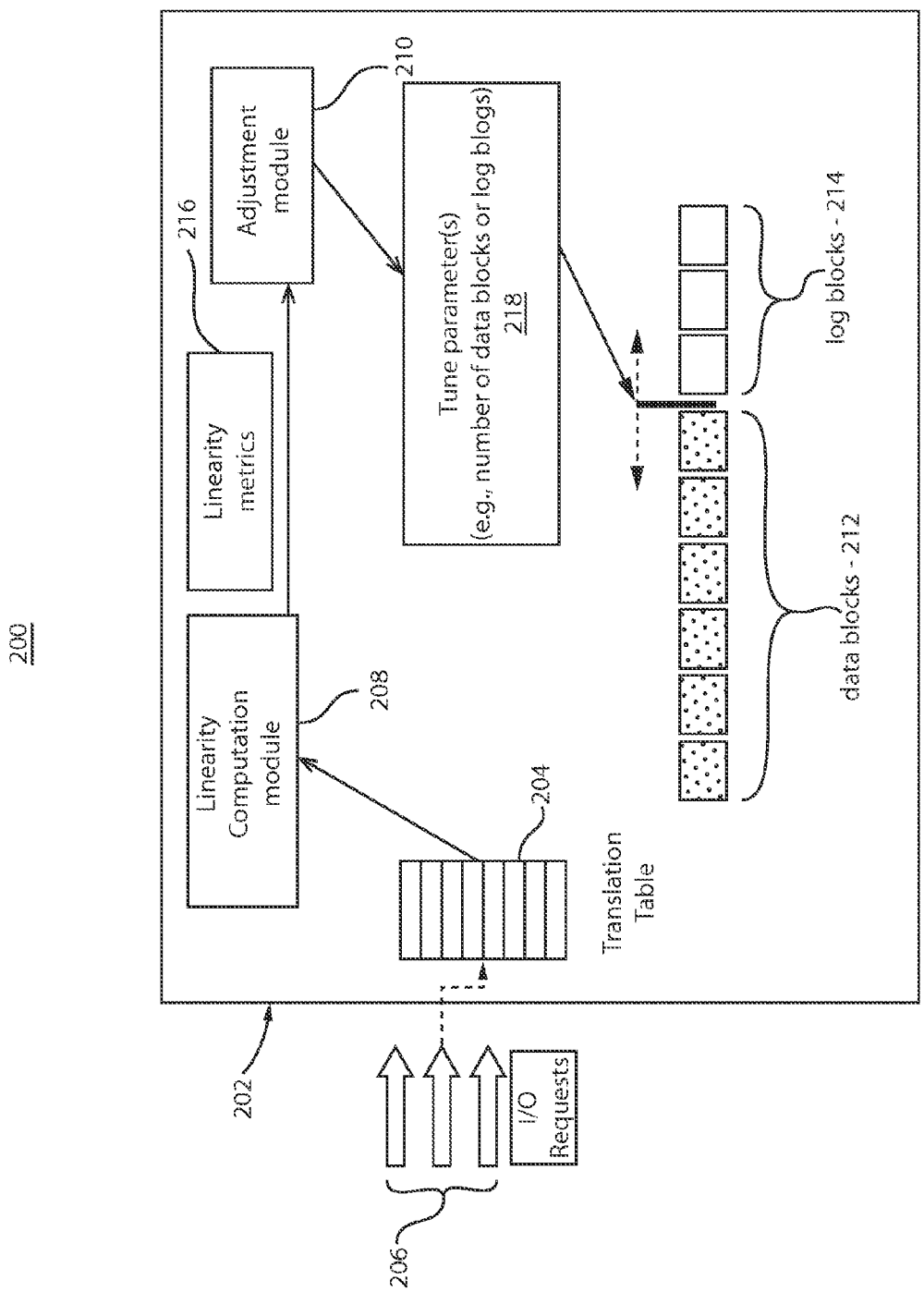
FIG. 3 is a block/flow diagram showing a flash memory of a solid state disk in accordance with one illustrative embodiment.

Referring to FIG. 3, an SSD controller or flash file-system 200 (see also SSD controller 12, FIG. 1) is illustratively depicted in accordance with one embodiment. A Flash Translation Layer (FTL) 202 is a component implemented in the SSD controller 200 (or a flash file-system) that works to address the constraints described above and exposes an array of Logical Page Addresses (LPAs) or Logical Page Numbers (LPNs) to a host, effectively emulating a standard block device such as provided in hard disk operations. The constraints include, e.g., that no in-place overwrite is available, that no random writes are available, limited erase or program cycles are available (limited wear). To address these constraints, indirect mapping is provided.

A translation table 204 is maintained in the controller 202 to track dynamic mapping between logical page numbers (LPNs) and actual physical page numbers (PPNs) in a flash memory (100, FIG. 1). It should be understood that a translation table is illustrative of one embodiment, and that other devices or structures may also be employed. For example, one can maintain tree structures for the logical-physical mappings or some other kind of data structures (combination of trees, tables, lists, hash-tables, etc.).

The translation table 204 tracks mappings between logical page addresses and physical pages addresses and server I/O requests 206. Since these translation entries are continuously changing (as indicated, FLASH cannot overwrite to the same page and hence writes to a different page and updates the translation entry), this table can be used as an indicator of the linearity of a workload. A linearity computation module 208 may be used to compute linearity of the translation table 204 to derive linearity metric(s) 216. Linearity metrics refer to a measure of a linear relationship between two variables or the same variable at different times. For example, these two variables could be the logical page addresses and the physical pages addresses of the I/O requests. In other embodiments, vectors indicating activity may be computed. Computing these vectors may be performed by splitting the translation or mapping table into multiple regions. In some embodiments, these regions could vary each time.

In other embodiments, the translation table 204 is considered an array and linearity is computed using an $R^2$ method or linear regression over two representative time periods to determine a linearity metric(s) 216, such as a direction vector over time. The direction vector may include a number from 0 to 1, where 0 indicates that this is a completely random workload access pattern and 1 indicates that this is a perfectly sequential workload pattern over time.

In one embodiment, the linearity metrics 216 are determined using a logical to physical (L2P) map (from translation table 204) to identify a workload pattern. L2P map is always present in the flash memory 100. The L2P map or mapping table is employed by the SSD controller 200 or memory management unit, to map a logical page onto a physical page. The operating system (in a file-system controlled setting) and/or the FTL software running on the controller sets up and controls the L2P map. The L2P map has a line for each logical page and cross-references physical pages to the logical pages. Accesses and changes to the L2P map may be accumulated over a time period, and the activity may be employed to determine access patterns or workload patterns.

The linearity metrics 216 may be provided to an adjustment module or tuning algorithm 210, which employs the linearity metrics 216 to decide a magnitude and direction (vector) for one or more tuning parameters 218. In one embodiment, the tuning parameter 218 indicates a number of data blocks 212 versus log blocks 214 in a flash memory 100.

In a particularly useful embodiment, a recent Translations (rT) table structure (a subset of the translation table 204) maintains most recent m logical to physical translations of pages that have been recently accessed in the SSD device 100. m is one parameter that can be dynamically adjusted depending on the working set size of running workloads.

In one embodiment, the most recent accesses are relevant to calculate the linearity metric 216 of the workload(s) accessing the SSD device 100. Every entry in the rT table may be composed of a (l, p, t) triplet, such that l is a logical page address and p is the corresponding physical page address in the SSD device and t is the timestamp of a last access to the p page. Anytime a page is accessed for a read or write (requests 206), the corresponding L2P mapping pair is stored in the rT table 204 (if it is not already there), and the corresponding timestamp is updated. If the rT table 204 already has m elements, the oldest translation is discarded.

Linear regression is a standard statistical approach used to model the relationship between a scalar dependent variable Y and one or more explanatory variables denoted X. A coefficient of determination $R^2$ linear regression algorithm may be employed in the linearity computation module 208. The $R^2$ is a statistical value that gives some information about the "goodness of fit". $R^2$ measures how well the regression line approximates the real data points. It should be understood that instead of an $R^2$ linear regression algorithm, other metrics may be computed such as other regression metrics, statistical parameters, etc.

In one example, the linearity computation module 208 may performed by the following steps to compute linearity metrics. Pseudo code for computing the linearity metric 216 may include the following.

Pseudocode for Linearity Computation:
Input: Recent Translation Table, rT
Output: Linearity Metric, LM
Sort the rT table according to the logical addresses, l.
Calculate the $R^2$ regression fit of the rT table, where the parameters of the linear regression X, and Y are: X: is the set $(x_1, x_2, \ldots x_m)$ of logical addresses in the rT table where $x_i = l_i$. Y: is the set $(y_1, y_2, \ldots y_m)$ of corresponding physical addresses in the rT table where $y_i = p_i$.

The R2 value is calculated as follows: Calculate the regression line y* using the following.

Least Squares Regression Method:

$$y^* = a + bx$$

The slope b and intercept a are calculated in the following order:

$$b = r\frac{SD_y}{SD_x},$$

$$a = \bar{Y} - b\bar{X} \text{ where}$$

$SD_y$ and $SD_x$ are the standard deviations of the Y and X sets respectively,
$\bar{Y}$ is the mean of the data set Y, and
$\bar{X}$ is the mean of the data set X.
The mean of the data set is calculated as shown below:

$$\bar{Y} = \frac{1}{n}\sum_{i=1}^{m} y_i$$

The variability of the data sets is measured through different sums of squares:

$$SS_{tot} = \sum_i (y_i - \bar{Y})^2,$$

the total sum of squares.

$$SS_{reg} = \sum_{i} (y^* - \overline{Y})^2,$$

the regression sum of squares.

$$SS_{err} = \sum_{i} (y_i - y_i^*)^2,$$

the sum of squares residuals

The $R^2$ value is calculated as follows:

$$R^2 = 1 - \frac{SS_{err}}{SS_{tot}}$$

The LM metric (represented by LM-new) is the R2 value calculated as shown above, where $0 \leq LM \leq 1$. The closer the value of LM to 1, the more linear the access pattern is. This computed LM (represented by LM-new) is passed to an adjustment module 210 (tuning algorithm)).

Once the linearity metrics 216 are computed the adjustment module 210 tunes one or more tunable parameters 218. Tuning adjustment may include other methods to adjust tunable parameters of an SSD using the usage history. Illustrative embodiments may include making a decision for adjustment by studying the trends in metric vectors, computing the amount of adjustment of the tunable parameters based on the metric vectors, etc. In one embodiment, a method for tuning a tunable parameter includes tuning a number of log blocks in a hybrid FTL algorithm. An example of this method is as follows.

Pseudocode for Tuning Adjustment:

Input: Linearity Metric (LM) for a past time interval (computed as shown above)=LM-new System Constants: Total No of Blocks=B Tunable System Parameter: No. of Log Blocks=$B_L$ [Note: Number of Data Blocks=$B_D$ will implicitly become: (B-$B_L$)]

Parameters: Number of time intervals for which history is maintained=N

Delta Threshold=$\Delta$

Standard Deviation Threshold=Std_$\Delta$

Adjustment=$B_A$

Minimum Log Blocks=$B_{MIN}$

Maximum Log Blocks=$B_{MAX}$

Algorithm State:

Let LM-prev represent the linearity metric computed in the last iteration.

Let D[1], D[2], ..., D[N] represent the difference between the successive linearity metrics computed in the past. The algorithm stores these values {LM-prev, D[1] ... D[N]} values as its state.

Algorithm: (Input=LM-new)

Step 1: Compute the latest difference in linearity metric; Add the latest difference to the history of differences by erasing the oldest difference (D[1]).

Remember the latest linearity metric for the next iteration.

D[1] = D[2] // overwriting the oldest difference D[1] with D[2]

D[2] = D[3]

⋮

D[N – 1] = D[N]

D[N] = LM-new – LM-prev // computing the latest difference and storing it in D[N]

LM-prev=LM-new //storing the current linearity metric for next invocation of the algorithm.

Step 2: Determine if adjusting the tunable parameter is desired by looking at the trend in the differences: One way to study the trend is to simply add up the differences and note the trend. Other ways may include counting how many positive differences and how many negative differences are present. Decisions can be made based on these differences.

```
Avg = Average Differences = (D[1] + D[2] + ... + D[N]) / N
Std = Standard Deviation of all differences
If ((Avg > Δ) OR (Avg < – Δ)) AND Std < Std_Δ
    Adjust = true;
Else
    Adjust = false;
    If (Adjust = false) Quit;
```

Step 3: Adjust the tunable parameters:

```
If (Sum > Δ)                          // increase the log blocks
    B_L = Min( B_L + B_A , B_MAX)      // but the log blocks cannot exceed B_MAX
else
if (Sum < –Δ)                         // decrease the log blocks
    B_L = Max( B_L – B_A , B_MIN)      // but log blocks cannot go below B_MIN.
```

By making the adjustments to the tunable parameters 218, the memory used in the flash memory 100 may be controlled to enhance useful lifetime of the memory. Internal SSD parameters are dynamically tuned to increase to increase application performance and lifetime.

In addition to changing the number of data blocks versus log blocks, other internal SSD parameters may be adjusted as well. Some example parameters that can be tuned or adjusted in accordance with the present principles may include an adjustment to a number of available log blocks, an adjustment to a number of pages to prefetch, an adjustment to switch modes between, e.g., block-based and page-based FTLs (in SSD devices that can support multiple FTL schemes), an adjustment to a granularity of the page size, etc. For example, in adjusting granularity in FTLs that support both 2 k page size and 4 k page size, the linearity metric can give hints as to when to use smaller pages sizes and when to use larger page size.

In another implementation, the linearity metric can also guide hybrid FTL schemes. One example may include making a decision to put workloads with random accesses in a single level cell (SLC) region and sequential accesses in a multiple level cell (MLC) region, since random accesses tend to wear out the device more than sequential accesses. Note SLC memory stores one bit in each cell, leading to faster transfer speeds, lower power consumption and higher cell endurance. MLC memory stores two bits in each cell. By storing more bits per cell, an MLC memory will achieve slower transfer speeds, higher power consumption and lower cell endurance than the SLC memory. This method may be employed with other memory types as well, e.g., triple memory cells (TLC), etc.

The adjustments called for by the adjustment module 210 may be performed during downtime or may be performed online (e.g., slowly in an incremental way) without interrupting applications.

Figure 4:
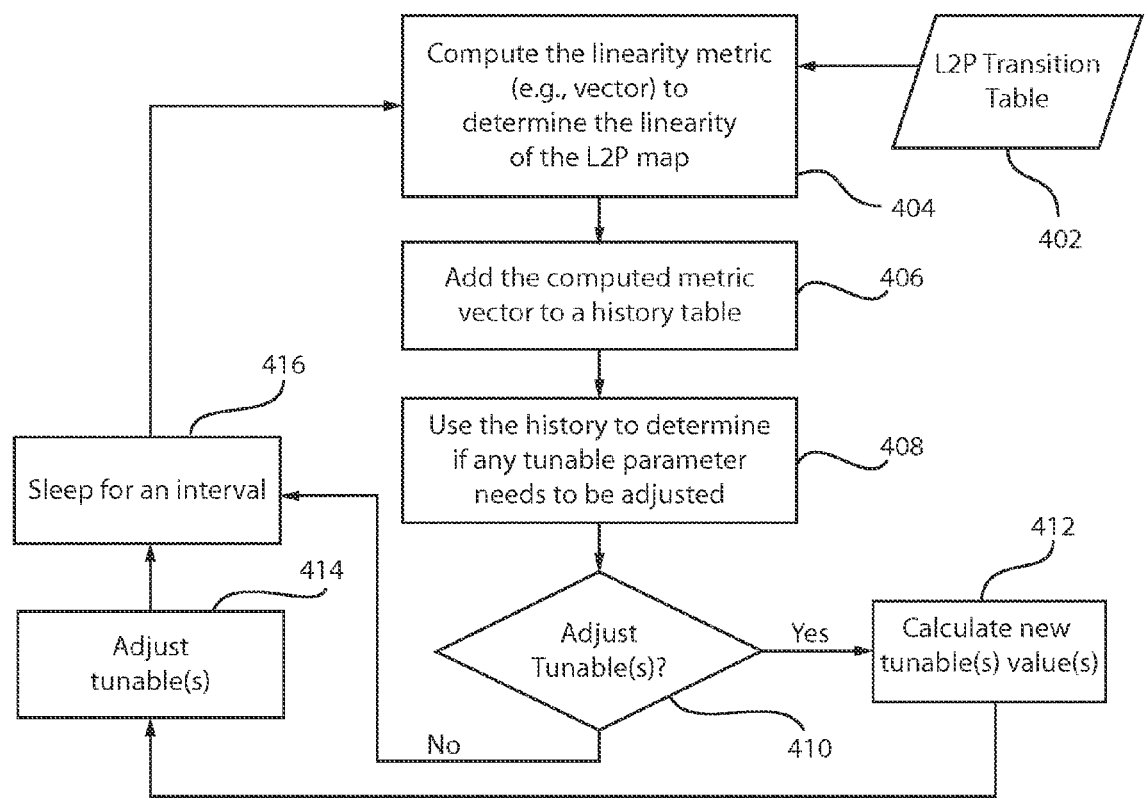
FIG. 4 is a block/flow diagram showing a system/method for tuning parameters in a solid state disk system in accordance with one illustrative embodiment.
Figure 5:
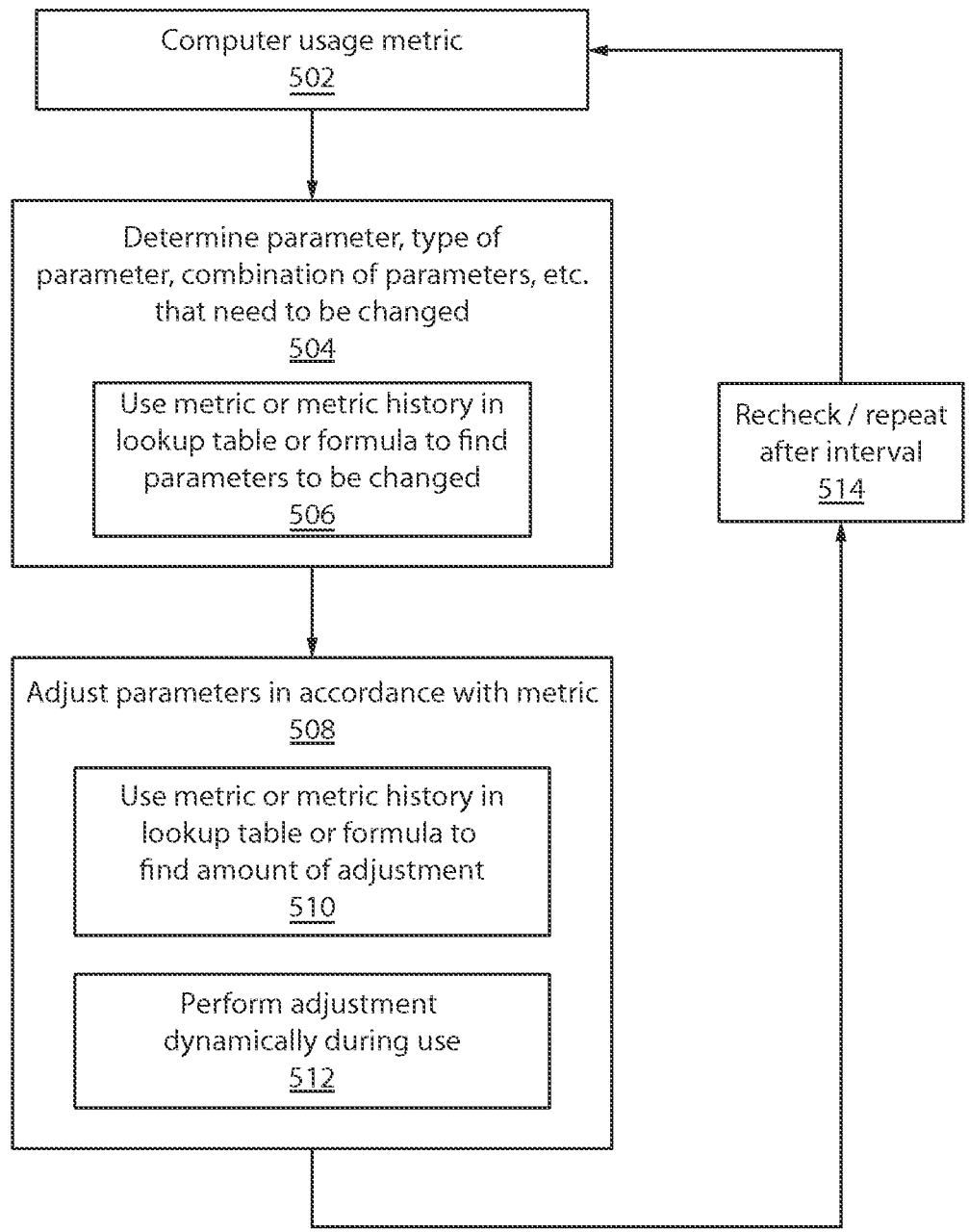
FIG. 5 is a block/flow diagram showing a system/method for tuning parameters in a solid state disk system in accordance with another illustrative embodiment.

It should be understood that reference to a "block" followed by a find numeral in the flow/block diagrams of FIGS. 4 and 5 does not refer to a block-sized memory unit. Instead, the blocks as referred to in FIGS. 4 and 5 are steps, modules, circuits, etc. as defined above.

Referring to FIG. 4, a block/flow diagram shows a system/method for adjusting SSD parameters in accordance with illustrative embodiments. In block 402, a logical to physical (L2P) translation table or other storage structure is provided in the FTL of an SSD controller. In block 404, a linearity metric vector is computed to determine the linearity of the L2P map. The linearity metric may be computed using historical data over a first period of time as compared to a second period of time. A regression analysis may be performed to determine the linearity. Other methods are also contemplated.

In block 406, a computed metric vector is added to a history table. In block 408, the history table is employed to determine if any FTL tunable parameter(s) need to be adjusted. Criteria may be provided to indicate that a significant change or a threshold change has occurred in workload or the like. In block 410, a decision is made as to whether tunable parameters need to be adjusted. If adjustment is needed, block 412 computes new FTL tunable parameter values. Historic data or changes in data may be correlated to desired settings for SSD parameters. This may be provided using a look up table or by computing an algorithm to determine new values for tunable parameters. In block 414, the FTL tunable parameters are adjusted by the determined amount.

If in block 410, a determination is made that no adjustments are needed or adjustments have be made in block 414, the method sleeps for an interval. After an interval has elapsed, the method continues with block 404.

Referring to FIG. 5, another method for tuning a solid state disk memory is illustratively depicted. In block 502, a metric representing a usage trend of a solid state disk memory is computed. The metric may include a linearity metric computed by comparing usage pattern data over at least two time intervals. The metric may be computed using a regression technique or other data analysis technique to compare usage pattern data over time. A logical to physical translation table or other data structure (e.g., hash table, tree structure, etc.) may be employed to obtain usage pattern data.

In block 504, a determination is made to as whether a parameter, type of parameter, combinations of parameters, etc. need to be adjusted or tuned to provide a change in performance. In block 506, metrics or historic changes in metrics are compared to determine an adjustment type, e.g., using a lookup table, inputting the metrics or the historic changes into a formula, etc. In this way a correlation between workload patterns can be interpreted to determine which adjustment parameters or combinations of parameters should be altered or tuned.

In block 508, the parameter is adjusted in accordance with the metric (or metric history) to change the performance. The amount of the adjustment may be determined in block 504 and 506, but may be determined separately, in block 510, by comparing metrics or historic changes in metrics to another lookup table to find an adjustment amount or by computing an adjustment amount by inputting metrics or historic changes in metrics into another formula. Adjusting the parameter may include adjusting the parameter of one or more of: a log-like write mechanism, a garbage collector and/or wear-leveling mechanism. The parameter may include of one or more of: a number of data blocks versus log blocks, a number of pages to prefetch, a block-based or page-based mode, a granularity of memory size, and/or a type of memory access.

In block 512, the parameter adjustment may be dynamically performed during usage of the solid state disk. This may include performing tasks slowly over time; using low activity intervals to update configure the memory, etc.

In block 514, some or all of blocks 502-512 may be repeated after an elapsed time interval to recheck and determine whether adjustments are needed after the elapsed time interval. Adjustments are accordingly carried out as described above.

Having described preferred embodiments for dynamic tuning of internal parameters for solid-state disk based on workload access patterns (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A solid state disk memory system, comprising:
a solid state disk controller having a translation layer, the translation layer including:
a data structure for storing access data;
a linearity computation module configured to compute a metric representing a usage trend of a solid state disk memory using the access data, the usage trend including a measurement of a trend between logical page addresses and physical page addresses responsive to I/O requests over at least two time periods; and
an adjustment module configured to determine whether a parameter needs to be adjusted and an amount of adjustment in accordance with the metric to change performance of the solid state disk memory.

2. The system as recited in claim 1, wherein the linearity computation module includes a regression technique and the metric includes a linearity metric determined by comparing usage pattern data over at least two time intervals.

3. The system as recited in claim 1, wherein the data structure includes a translation table including a logical to physical translation map to obtain usage pattern data.

4. The system as recited in claim 1, wherein the adjustment module includes a lookup table configured to compare metrics or historic changes in metrics to determine an adjustment type and amount.

5. The system as recited in claim 1, wherein adjustment module includes a formula configured to compare metrics or historic changes in metrics to determine an adjustment type and amount.

6. The system as recited in claim 1, wherein the adjustment module is configured to adjust the parameter dynamically during usage of the solid state disk memory.

7. The system as recited in claim 1, wherein the solid state disk controller further includes one or more of a log block write mechanism, a garbage collector and/or wear-leveling mechanism, to balance usage of the solid state disk memory to increase overall lifetime.

8. The system as recited in claim 1, wherein the adjustment module adjusts the parameter including one or more of: a number of data blocks versus log blocks, a number of pages to prefetch, or a block-based or page-based mode of flash memory access in said solid state disk memory.

9. The system as recited in claim 1, wherein the data structure includes a hash table or a tree structure.

10. A solid state disk memory system, comprising:
a solid state disk controller having a translation layer, the translation layer including:
a data structure for storing access data;
a linearity computation module configured to compute a metric representing a usage trend of a solid state disk memory using the access data, said usage trend including data on assignment of logical page addresses and physical page addresses responsive to I/O requests over at least two time periods; and
an adjustment module configured to determine whether a parameter needs to be adjusted and an amount of adjustment in accordance with the metric to change performance of the solid state disk memory; and
one or more solid state disks being included in the solid state disk memory, the solid state disks being managed by the solid state disk controller to increase lifetime of the disks by distributing usage over the one or more solid state disks.

11. The system as recited in claim 10, wherein the linearity computation module includes a regression technique and the metric includes a linearity metric determined by comparing usage pattern data over at least two time intervals.

12. The system as recited in claim 10, wherein the data structure includes a translation table including a logical to physical translation map to obtain usage pattern data.

13. The system as recited in claim 10, wherein the adjustment module includes a lookup table configured to compare metrics or historic changes in metrics to determine an adjustment type and amount.

14. The system as recited in claim 10, wherein adjustment module includes a formula configured to compare metrics or historic changes in metrics to determine an adjustment type and amount.

15. The system as recited in claim 10, wherein the adjustment module is configured to adjust the parameter dynamically during usage of the solid state disk memory.

16. The system as recited in claim 10, wherein the solid state disk controller further includes one or more of a log block write mechanism, a garbage collector and/or wear-leveling mechanism, to balance usage of the solid state disk memory to increase overall lifetime.

17. The system as recited in claim 10, wherein the adjustment module adjusts the parameter including one or more of: a number of data blocks versus log blocks, a number of pages to prefetch, a block-based or page-based mode of flash memory access in said solid state disk memory.

18. The system as recited in claim 10, wherein the data structure includes a hash table or a tree structure.

19. A non-transitory computer readable storage medium comprising a computer readable program for tuning a solid state disk memory, wherein the computer readable program when executed on a solid state disk controller causes the solid state disk controller to perform the steps of:
computing a linearity metric by employing a logical to physical translation table to obtain usage pattern data representing a usage trend of a solid state disk memory over one or more time intervals, the usage trend including data on the assignment of logical page addresses and physical page addresses responsive to I/O requests over at least two time periods;
determining whether one or more parameters need to be adjusted to provide a change in performance by consulting a lookup table or formula; and
adjusting the one or more parameters in accordance with the metric to change the performance.

20. The computer readable storage medium as recited in claim 19, wherein computing a linearity metric includes employing a regression technique to compare usage pattern data over time.

21. The computer readable storage medium as recited in claim 19, wherein adjusting the one or more parameters includes adjusting the one or more parameters dynamically during usage of the solid state disk.

22. The computer readable storage medium as recited in claim 19, wherein adjusting the one or more parameters includes adjusting one or more of: a log block write mechanism, a garbage collector and/or wear-leveling mechanism.

23. The computer readable storage medium as recited in claim 19, wherein adjusting the one or more parameters includes adjusting one or more of: a number of data blocks versus log blocks, a number of pages to prefetch, a block-based or page-based mode of flash memory access in said solid state disk memory.

24. The computer readable storage medium as recited in claim 19, further comprising rechecking whether adjustments are needed after an elapsed time interval.

* * * * *